(12) United States Patent
Weston et al.

(10) Patent No.: US 12,103,512 B2
(45) Date of Patent: Oct. 1, 2024

(54) ENERGY OPTIMIZATION FOR INTEGRATED POWERTRAIN OF COMBINED VEHICLE SYSTEM HAVING VEHICLE AND ELECTRICALLY POWERED TRAILER TOWED BY THE VEHICLE

(71) Applicant: Ford Global Technologies, LLC, Dearborn, MI (US)

(72) Inventors: Keith Weston, Canton, MI (US); David Guglielmo, Northville, MI (US); Andrew Denis Lewandowski, Sterling Heights, MI (US); Shehan Haputhanthri, Canton, MI (US); Brendan F. Diamond, Grosse Pointe, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 280 days.

(21) Appl. No.: 17/736,565

(22) Filed: May 4, 2022

(65) Prior Publication Data

US 2023/0356707 A1    Nov. 9, 2023

(51) Int. Cl.
*B60W 20/13* (2016.01)
*B60W 50/10* (2012.01)

(52) U.S. Cl.
CPC ............ *B60W 20/13* (2016.01); *B60W 50/10* (2013.01); *B60W 2300/14* (2013.01); *B60W 2520/10* (2013.01); *B60W 2530/203* (2020.02); *B60W 2540/10* (2013.01)

(58) Field of Classification Search
CPC ...... B60W 10/06; B60W 10/08; B60W 20/11; B60W 20/13; B60W 2300/14; B60W 2520/10; B60W 2530/203; B60W 2540/10; B60W 30/1882; B60W 50/10; B62D 53/021; B62D 59/04
See application file for complete search history.

(56) References Cited

U.S. PATENT DOCUMENTS

| | | | |
|---|---|---|---|
| 6,390,215 B1 * | 5/2002 | Kodama | B60L 50/62 180/2.1 |
| 6,516,925 B1 | 2/2003 | Napier et al. | |
| 8,627,908 B2 * | 1/2014 | Wellborn | B60L 15/42 701/96 |
| 9,321,357 B2 * | 4/2016 | Caldeira | B60L 50/53 |
| 9,457,666 B2 * | 10/2016 | Caldeira | B60D 1/64 |
| 10,099,736 B2 | 10/2018 | Gugel et al. | |
| 10,407,045 B2 | 9/2019 | Kneitz et al. | |
| 10,821,853 B2 | 11/2020 | Healy et al. | |
| 11,390,285 B2 * | 7/2022 | Adam | B60W 10/18 |
| 11,420,695 B2 * | 8/2022 | Viele | B62D 53/005 |

(Continued)

FOREIGN PATENT DOCUMENTS

CN    111231966 A    6/2020

*Primary Examiner* — Tyler J Lee
(74) *Attorney, Agent, or Firm* — David B. Kelley; Brooks Kushman P.C.

(57) ABSTRACT

A system includes a vehicle having an electrically powered trailer towed thereto. The vehicle has a vehicle powertrain, and the trailer has a trailer powertrain. A controller, in order to propel the vehicle with the trailer towed thereto, operates the vehicle powertrain and the trailer powertrain according to a combined efficiency map based on (i) an efficiency map associated with the vehicle powertrain and (ii) an efficiency map associated with the trailer powertrain.

7 Claims, 8 Drawing Sheets

(56) References Cited

U.S. PATENT DOCUMENTS

| | | | |
|---|---|---|---|
| 11,479,144 B2* | 10/2022 | Healy | B60K 11/06 |
| 11,485,330 B1* | 11/2022 | Kulkarni | B60D 1/06 |
| 2005/0137784 A1* | 6/2005 | Grougan | B62D 13/06 |
| | | | 701/408 |
| 2007/0193795 A1* | 8/2007 | Forsyth | B60L 50/50 |
| | | | 180/65.285 |
| 2009/0093928 A1* | 4/2009 | Getman | G01S 15/931 |
| | | | 701/37 |
| 2010/0065344 A1* | 3/2010 | Collings, III | B60L 3/10 |
| | | | 180/2.1 |
| 2011/0287888 A1* | 11/2011 | Muller | B60K 6/442 |
| | | | 477/3 |
| 2016/0318421 A1* | 11/2016 | Healy | B60L 58/10 |
| 2017/0287320 A1* | 10/2017 | Meade | G08C 17/02 |
| 2018/0080852 A1* | 3/2018 | Hagan, Jr. | B60D 1/155 |
| 2018/0099712 A1* | 4/2018 | Bean | G08B 13/126 |
| 2019/0056492 A1* | 2/2019 | Geiger | G01S 13/931 |
| 2019/0084537 A1* | 3/2019 | Kasper | B60T 8/17551 |
| 2019/0233034 A1* | 8/2019 | Viele | B60D 1/36 |
| 2020/0198596 A1* | 6/2020 | Houle | B60D 1/06 |
| 2020/0324763 A1* | 10/2020 | Switkes | G08G 1/161 |
| 2021/0016678 A1* | 1/2021 | Healy | B60L 50/40 |
| 2022/0097709 A1* | 3/2022 | Adam | B60W 60/0051 |

\* cited by examiner

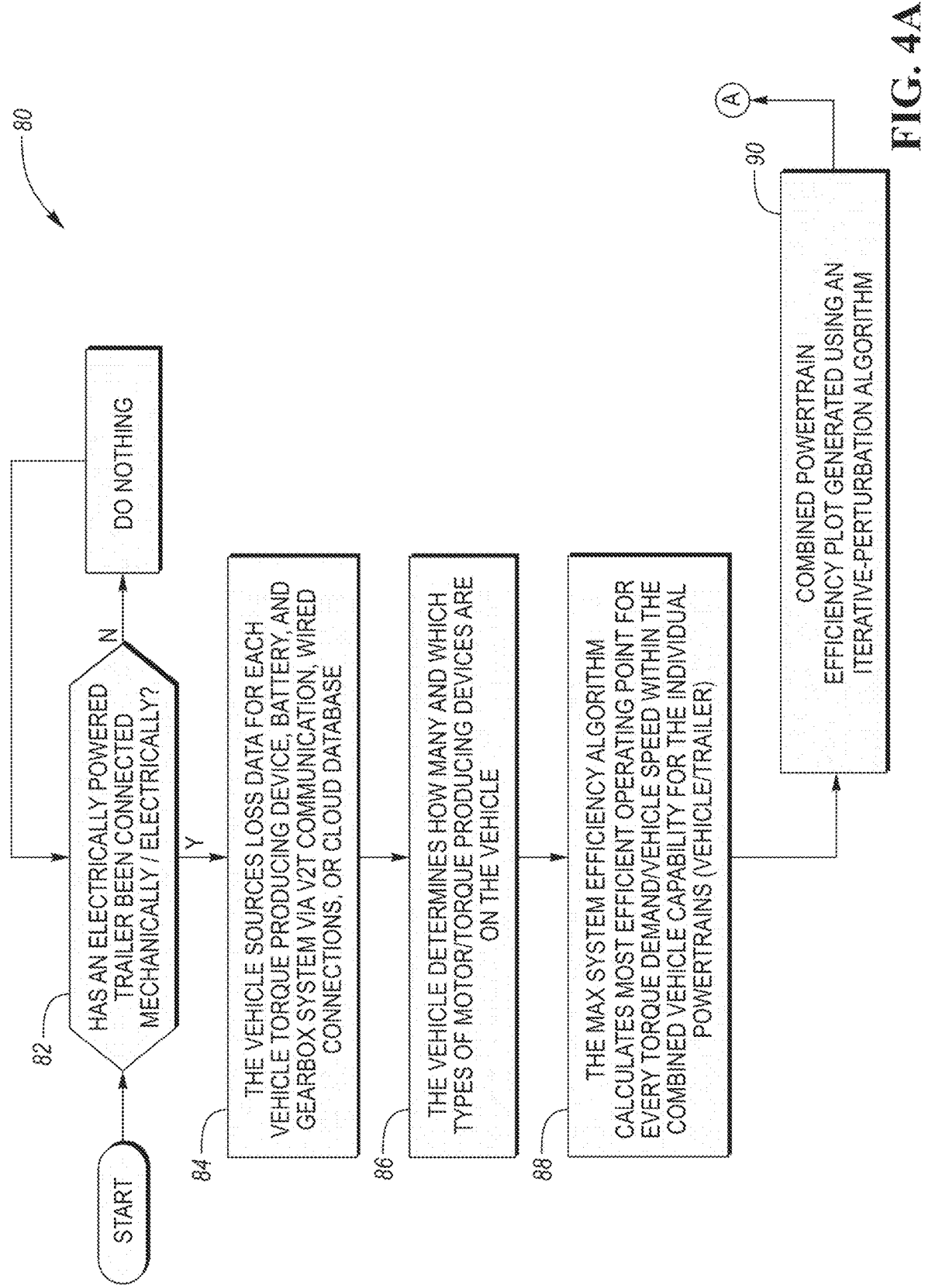

ENERGY OPTIMIZATION FOR INTEGRATED POWERTRAIN OF COMBINED VEHICLE SYSTEM HAVING VEHICLE AND ELECTRICALLY POWERED TRAILER TOWED BY THE VEHICLE

TECHNICAL FIELD

This disclosure relates to a combined vehicle system having a vehicle and an electrically powered trailer towed by the vehicle.

BACKGROUND

A combined vehicle system having a vehicle and an electrically powered trailer towed by the vehicle includes two powertrains. One of the powertrains belongs to the vehicle and the other one of the powertrains belongs to the trailer. An issue is how these two powertrains are to be operated due to the presence of one another.

SUMMARY

A system including a vehicle having an electrically powered trailer towed thereto is provided. The vehicle has a vehicle powertrain, and the trailer has a trailer powertrain. A controller is programmed to, in order to propel the vehicle with the trailer towed thereto, operate the vehicle powertrain and the trailer powertrain according to a combined efficiency map based on (i) an efficiency map associated with the vehicle powertrain and (ii) an efficiency map associated with the trailer powertrain.

The controller may be further programmed to control components of the vehicle powertrain and components of the trailer powertrain for efficiency or torque split based on operational status of the vehicle in realizing operation of the vehicle powertrain and the trailer powertrain according to the combined efficiency map.

The controller may be further programmed to obtain loss data of components of the vehicle powertrain and to obtain loss data of components of the trailer powertrain. In this case, the efficiency map associated with the vehicle powertrain may factor in the loss data of components of the vehicle powertrain and the efficiency map associated with the trailer powertrain may factor in loss data of components of the trailer powertrain. The loss data can be estimated from component models as well.

The combined efficiency map may provide for operation of the vehicle powertrain and the trailer powertrain to have a highest combined efficiency for a given driver demanded power and vehicle speed combination.

The combined efficiency map may provide for operation of the vehicle powertrain to be in a most efficient region of the efficiency map associated with the vehicle powertrain.

The vehicle powertrain may include a first traction battery, and the trailer powertrain may include a second traction battery. The vehicle powertrain may further include an engine. The controller may be further programmed to cause electrical power to be transferred between the first traction battery and the second traction battery in order to maintain operation of the vehicle powertrain and the trailer powertrain according to the combined efficiency map.

The controller may be further programmed to realize operation of the vehicle powertrain and the trailer powertrain via torque vectoring between drive axles and propulsion sources on the vehicle powertrain and the trailer powertrain.

The controller may be further programmed to generate the combined efficiency map upon the trailer being connected to the vehicle.

The controller may be further programmed to share the efficiency map associated with the vehicle powertrain and/or the efficiency map associated with the trailer powertrain with a third party.

A control system for a combined vehicle system having a vehicle and an electrically powered trailer towed by the vehicle with the vehicle including a vehicle powertrain and the trailer including a trailer powertrain is also provided. The control system includes a controller programmed to, in order to propel the combined vehicle system, operate the vehicle powertrain and the trailer powertrain according to a combined efficiency map based on (i) an efficiency map associated with the vehicle powertrain and (ii) an efficiency map associated with the trailer powertrain.

A method is also provided. The method includes, upon an electrically powered trailer having a trailer powertrain being connected to a vehicle having a vehicle powertrain for the trailer to be towed by the vehicle, generating, by a controller of the vehicle, a combined efficiency map based on (i) an efficiency map associated with the vehicle powertrain and (ii) an efficiency map associated with the trailer powertrain. The method further includes operating, by the controller of the vehicle, in order to propel the vehicle with the trailer towed thereto, the vehicle powertrain and the trailer powertrain according to the combined efficiency map.

BRIEF DESCRIPTION OF THE DRAWINGS

FIGS. 4A and 4B illustrate a more detailed flowchart depicting operation of the energy management optimization strategy;

DETAILED DESCRIPTION

Embodiments are disclosed herein. It is to be understood, however, that the disclosed embodiments are merely examples and other embodiments may take various and alternative forms. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

Figure 1:
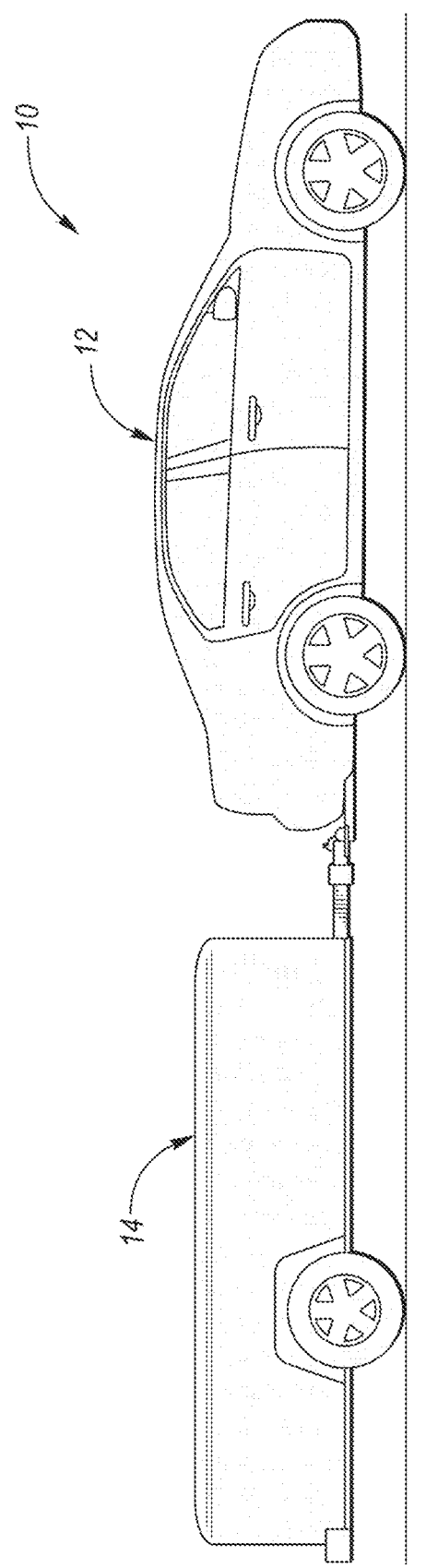
FIG. 1 illustrates a perspective view of a combined vehicle system having an electrified vehicle (EV) and an electrically powered trailer towed by the EV.
Figure 2A:
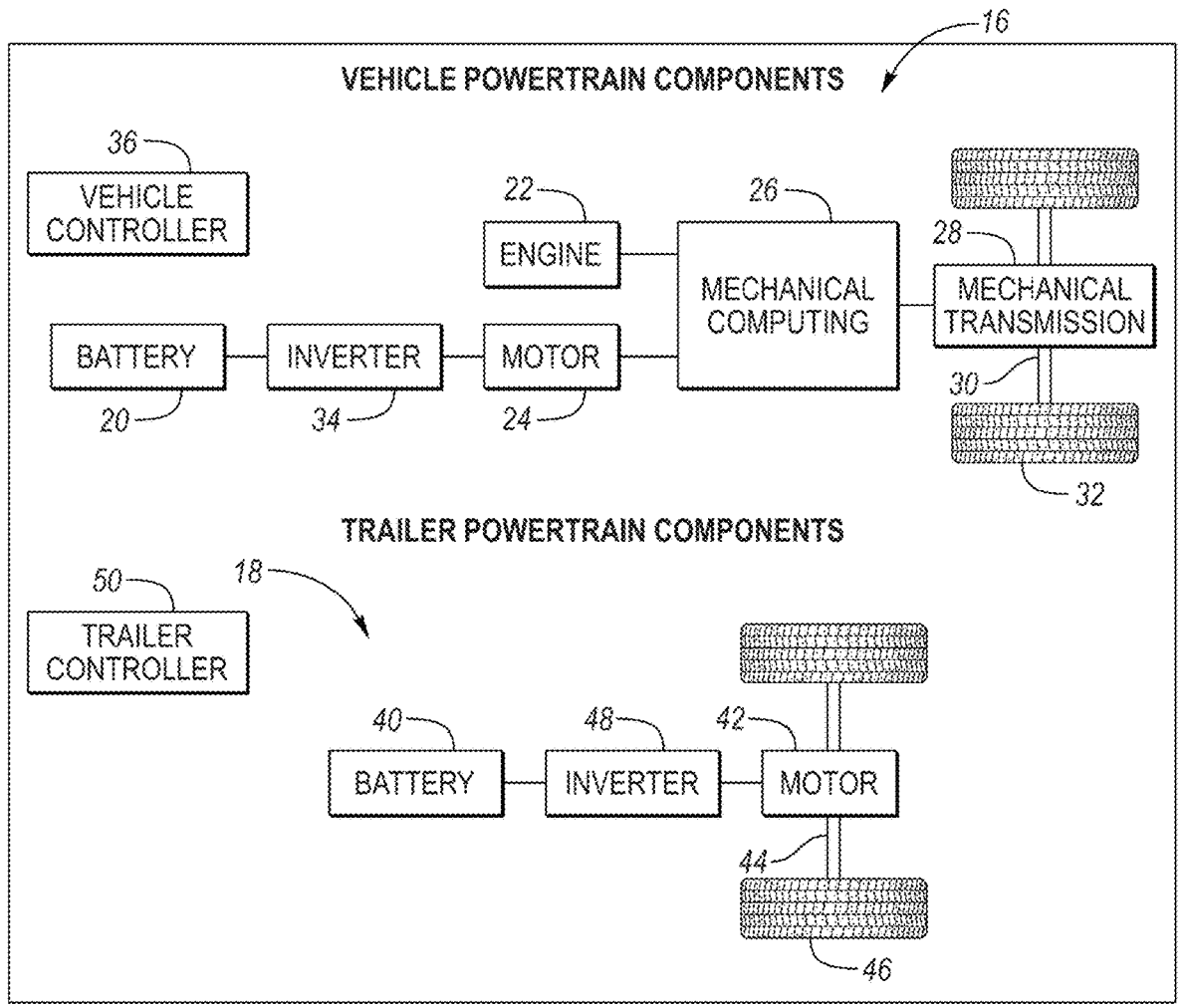
FIG. 2A illustrates a block diagram of a vehicle powertrain of the EV and a trailer powertrain of the trailer.
Figure 2B:
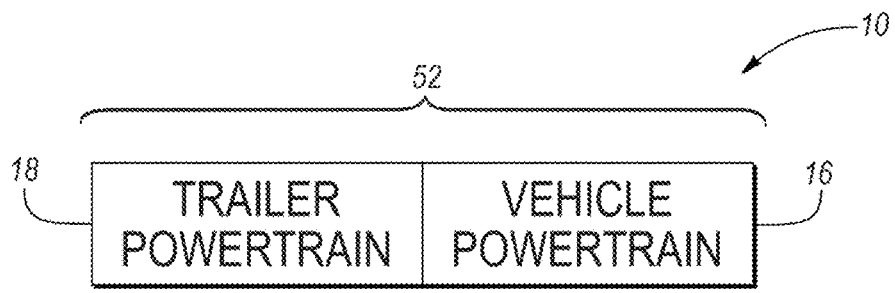
FIG. 2B illustrates a block diagram of an integrated powertrain of the combined vehicle system, the integrated powertrain being comprised of the vehicle powertrain and the trailer powertrain.

Referring now to FIGS. 1, 2A, and 2B, a combined vehicle system 10 will be described. FIG. 1 illustrates a perspective view of combined vehicle system 10. As shown in FIG. 1, combined vehicle system 10 includes an electrified vehicle (EV) 12 and an electrically powered trailer 14 towed by the EV. As shown in the block diagrams of FIGS. 2A and 2B, EV 12 includes a powertrain 16 and trailer 14 includes a powertrain 18. Thus, as shown in FIG. 2B, combined vehicle system 10 includes an integrated powertrain 52 (or "combined powertrain") comprised of vehicle powertrain 16 and trailer powertrain 18.

Vehicle powertrain 16 includes a traction battery 20 for providing power to propel EV 12. In this example, vehicle powertrain 16 further includes an engine 22. As such, in this example, for instance, vehicle powertrain 16 is a "hybrid electric vehicle" (HEV) powertrain. In other embodiments, vehicle powertrain 16 does not include an engine. As such, in these other embodiments, for instance, vehicle powertrain 16 is a "battery-only electric vehicle" (BEV) powertrain.

Vehicle powertrain 16 further includes an electric motor 24 mechanically connected via a mechanical computing device 26 to a transmission 28. Transmission 28 is mechanically connected to a drive axle 30 that is mechanically connected to wheels 32 of EV 12. Engine 22 is also mechanically connected via mechanical computing device 26 to transmission 28. Electric motor 24 can provide propulsion capability for EV 12 while engine 22 is turned on or off.

Traction battery 20 stores electrical energy that can be used by electric motor 24 for propelling EV 12. Traction battery 20 typically provides a high-voltage (HV) direct current (DC) output. Traction battery 20 is electrically connected to electric motor 24 via an inverter 34 of vehicle powertrain 16. Inverter 34 provides the ability to transfer energy from traction battery 20 to electric motor 24. For example, traction battery 20 provides a DC voltage while electric motor 24 requires an alternating current (AC) input to function. Inverter 34 converts DC power from traction battery 20 into AC power to operate electric motor 24 for propelling EV 12.

Vehicle powertrain 16 further includes a controller ("vehicle controller") 36. Vehicle controller 36 is operable to control and monitor the operation of the components of vehicle powertrain 16. Vehicle controller 36 includes electronics, software, or both, to perform control functions for operating vehicle powertrain 16. In embodiments, vehicle controller 36 is a combination vehicle system controller and powertrain control module (VSC/PCM). Although vehicle controller 36 is shown as a single device, vehicle controller 36 may include one or more controllers in the form of one or more hardware devices, or one or more software controllers with one or more hardware devices.

Trailer 14 is an electrified trailer in that trailer powertrain 18 includes a traction battery 40 for providing power to propel the trailer. In this example, unlike vehicle powertrain 16, trailer powertrain 18 does not include an engine. Trailer powertrain 18 further includes an electric motor 42. Electric motor 42 is mechanically connected to a drive axle 44 that is mechanically connected to wheels 46 of trailer 14. Traction battery 40 stores electrical energy that can be used by electric motor 42 for propelling trailer 14. Traction battery 40 is electrically connected to electric motor 42 via an inverter 48 of trailer powertrain 18. Inverter 48 converts DC power from traction battery 40 into AC power to operate electric motor 42 for propelling trailer 14.

Trailer powertrain 18 further includes a controller ("trailer controller") 50. Trailer controller 50 is operable to control and monitor the operation of the components of trailer powertrain 18. Trailer controller 50 includes electronics, software, or both, to perform control functions for operating trailer powertrain 18. In embodiments, trailer controller 50 is a combination trailer system controller and powertrain control module (TSC/PCM). Although trailer controller 50 is shown as a single device, trailer controller 50 may include one or more controllers in the form of one or more hardware devices, or one or more software controllers with one or more hardware devices.

As indicated, trailer 14 is connected to EV 12 to form combined vehicle system 10. As EV 12 includes vehicle powertrain 16 and as trailer 14 includes trailer powertrain 18, combined vehicle system 10 includes integrated powertrain 52 comprised of vehicle powertrain 16 and trailer powertrain 18. This integration of trailer powertrain 18 with vehicle powertrain 16 into a combined powertrain can assist with increasing the range of EV 12 and enabling the EV to tow heavier loads.

Power and/or control hardwire connection lines may extend between vehicle powertrain 16 and trailer powertrain 18 via the connection between EV 12 and trailer 14. As such, for instance, vehicle controller 36 and trailer controller 50 may communicate control signals with one another whereby the controllers may coordinate the operation of vehicle powertrain 16 and trailer powertrain 18, a controller of one of the powertrains may control the controller of the other powertrain to thereby control components of the other powertrain whereby the one controller is effectively the sole controller for integrated powertrain 52, and the like; traction battery 20 and traction battery 40 may transfer power between one another such as for recharging; etc. Of course, such control communications may be done wirelessly.

For EV 12, regardless of the type of its powertrain architecture, there is a set of operational conditions of vehicle powertrain 16 for each torque demand, vehicle speed, vehicle mass, etc., in which the overall vehicle, after accounting for aerodynamics, weight, desired maneuver, etc., will have the highest system level energy efficiency.

In the exemplary example, vehicle powertrain 16 is a hybrid electric vehicle powertrain having electric motor 24 and engine 22 coupled with transmission 28 to propel EV 12. Due to the relatively sophisticated nature of how the components of vehicle powertrain 16 work together, an energy management strategy optimization and traction battery energy management calibration tool is used to define when and how much to charge and discharge traction battery 20, when and how much to use engine 22, etc. This tool takes in inputs like fuel maps, electrical and mechanical losses, hardware configuration, gear ratio, vehicle road loads, state-of-charge (SOC) windows, drivability constraints, and the like to determine the optimal system efficiency of vehicle powertrain 16.

In further detail, HEV powertrains control the engine (e.g., engine on time including when to start and stop the engine, the engine power, etc.) and the traction battery (e.g., when the battery charges and discharges, the traction battery power, etc.) according to energy management calibration tables to change the operation conditions of the vehicle. Such energy management tables can be calibrated to operate the vehicle powertrains in desired regions to achieve an optimal system level fuel economy.

AWD (all-wheel drive) BEV powertrains have the ability to independently control torque distribution between the front and rear sets of wheels through independent motors on each axle. Due to various factors including electric motor efficiency and system losses varying based on speed and torque output, determining the optimal torque distribution for each axle with respect to a system energy management perspective is desired in order to optimize energy usage during vehicle operation. For an eAWD vehicle, optimal efficiency torque split can differ significantly from an equal proportion, especially in applications where the axle capacity varies. Operating in an efficiency split allows for a best possible energy efficiency. Switching to tables to define amount of torque to send to the different axles is employed to optimize vehicle overall performance.

Trailer powertrain 18 has the same type of architecture as an AWD BEV powertrain in that torque distribution to drive axle 44 is accomplished through electric motor 42 on the drive axle. Due to many factors including efficiency of electric motor 42 and system losses varying based on speed and torque output, determining the optimal torque distribution for drive axle 44 with respect to a system energy management perspective is desired to optimize energy usage during operation of trailer powertrain 18.

With a purpose of incorporating trailer 14 with EV 12 being to increase range and capability to the EV, an issue is how vehicle powertrain 16 and trailer powertrain 18 are to operate together. That is, an issue is how integrated powertrain 52, comprised of vehicle powertrain 16 and trailer powertrain 18, is to be operated.

Combined vehicle system 10 in accordance with this disclosure employs an energy management optimization strategy for integrated powertrain 52. The energy management optimization strategy factors in system level electrical and mechanical losses across various operation conditions for both vehicle powertrain 16 and trailer powertrain 18 to determine a most efficient (i.e., optimized) operation for integrated powertrain 52. This optimized operation for integrated powertrain 52 may be realized via energy management calibration for vehicle powertrain 16 (which is a HEV powertrain) and torque vectoring for trailer powertrain 18 (which is a BEV powertrain) (and for vehicle BEV powertrains) between each powered axle and propulsion source on EV 12 and trailer 14. A controller such as vehicle controller 36, in coordination with trailer controller 50, is configured to control vehicle powertrain 16 and trailer powertrain 18, and thereby control integrated powertrain 52, pursuant to the energy management optimization strategy.

Three general aspects are involved in developing and deploying the energy management optimization strategy. The first aspect includes obtaining component level operation data (for efficiency) for each component in the architecture of integrated powertrain 52 and developing system level efficiency contour maps for vehicle powertrain 16 and trailer powertrain 18. The efficiency contour maps for vehicle powertrain 16 and trailer powertrain 18 are developed to map efficiencies across speed, torque, traction battery state-of-charge (SOC), and other relevant inputs. Much of this loss map and road load determination is typically completed during vehicle and trailer development.

The second aspect involves communicating information regarding system optimal efficiencies between vehicle controller 36 and trailer controller 50 upon trailer 14 being connected to EV 12. Using an in-vehicle or cloud-based optimization algorithm, such as used during vehicle development for HEV or BEV type vehicles, coupling between vehicle powertrain 16 and trailer powertrain 18 for optimal efficiency operation occurs to create a new combined system level efficiency contour map for integrated powertrain 52. Using this combined efficiency map for integrated powertrain 52, a new set of calibration tables may be created corresponding to the architecture of integrated powertrain 52. These calibrations are uploaded to vehicle controller 36. Vehicle controller 36 can thereby control vehicle powertrain 16 in a desired region of the combined efficiency map for integrated powertrain 52 and/or maintain optimal torque split between powered axles of EV 12 and trailer 14 based on the current operational status of EV 12.

The optimization algorithm initially focuses on optimizing for most commonly encountered conditions to minimize wait/down time after coupling of trailer 14 to EV 12. A base calibration providing a generic vehicle to trailer operation can be employed until a more refined optimized calibration can be finished. Once a calibration is created based on a vehicle and a trailer, the calibrations can be used for other users by identifying similar vehicle and trailer characteristics. Essentially pre-built energy optimized calibrations can be accessed via the cloud by users of different vehicles. These pre-built combined vehicle energy management optimized calibrations can be uploaded to vehicles via over-the-air updates.

The communicating of information regarding system optimal efficiencies between vehicle controller 36 and trailer controller 50 upon trailer 14 being connected to EV 12 may occur using wireless (e.g., Bluetooth, vehicle modem, etc.) or wired (e.g., controller area network (CAN)/local area network (LAN)) communications. Information indicative of EV 12 of the communicated information may include information such as powertrain architecture and capability (power split, BEV, etc.) of vehicle powertrain 16, loss maps associated with the vehicle powertrain, road loads (F terms), size/capacity of traction battery 20, existing optimal vehicle powertrain operation, and weight and towing capacity of the EV. Information indicative of trailer 14 of the communicated information may include information such as information of trailer powertrain 16 including number of motors, number of wheels, road loads, loss maps, size/capacity of traction battery 40, capability of the trailer powertrain, and weight of the trailer. The loss maps can be estimated from component models as well.

The energy management-based optimization occurs based on powertrain architecture and control strategy used on the vehicle. Main inputs from driving the vehicle include traction battery SOC, driver demanded wheel torque, vehicle speed, combined vehicle weight, and relative powertrain capability. Optimization outputs can include for all powertrain types, torque split between vehicle and trailer and powered axles on trailer during regenerative braking and propulsion; for BEV powertrains, torque split between axles; for modular hybrid transmission (MHT) powertrains, when to shift, engine on time including when to start and stop the engine, traction battery charging, etc.; and for power-split powertrains, engine speed, traction battery charging, when to start and stop the engine, etc.

Further, calibration ranges can also be predetermined such that the calibration that is created for optimal energy management does not violate predetermined noise, vehicle, harshness (NVH)/drivability rules. Some of these rules could be embedded to algorithms/rules which create the calibration tables from the system efficiency maps.

The third aspect involves applying optimal torque vectoring calibration to EV 12 and trailer 14 during steady state and varying operating conditions. Adjustments from optimal operating conditions during driving of combined vehicle system 10 based on encountered operational conditions are made. For example, in the case of excessive thermal status of components such as traction battery 20 and/or electric motor 24 of vehicle powertrain 16 becoming very hot, an adjustment is to switch to more propulsion from trailer powertrain 18; in the case of excessive wheel torque being demanded, an adjustment is to apply full torque capability from both vehicle powertrain 16 and trailer powertrain 18; in the case of excessive slip being detected, an adjustment is to request equally distributed torque split, up to capacity, across all axles; and in the case of instability of trailer 14, an adjustment is requesting trailer powertrain 18 based instability arresting torque as needed.

Further, during the optimization, rules can be applied to account for drivability/NVH concerns such as leveraging existing drivability/efficiency optimized calibrations within EV 12 and trailer 14. For example, in AWD BEVs, generally, it is advantageous to command at least some torque on the secondary drive unit (SDU) (even though entirely primary drive unit (PDU) based torque is more efficient) for drivability, lash, efficiency, and other vehicle performance/drivability concerns.

Figure 3:
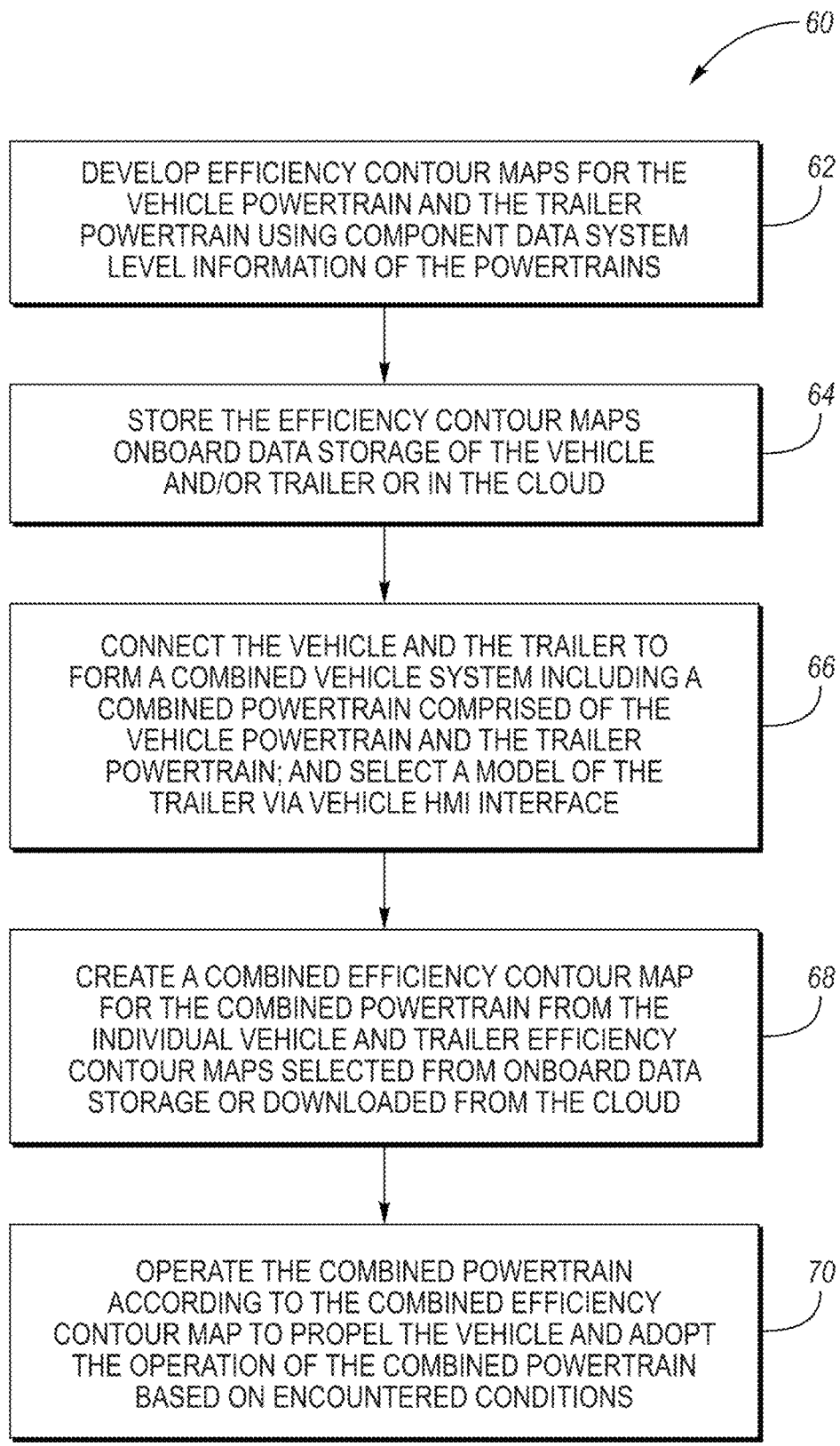
FIG. 3 illustrates a flowchart depicting operation of an energy management optimization strategy for the integrated powertrain of the combined vehicle system.

Referring now to FIG. 3, with continual reference to FIGS. 1, 2A, and 2B, a flowchart 60 depicting operation of an energy management optimization strategy for integrated powertrain 52 of combined vehicle system 10 is shown. The operation begins with developing efficiency contour maps for vehicle powertrain 16 and trailer powertrain 18 using component data system level information of the vehicle and trailer powertrains, as indicated by process block 62. The efficiency contour maps are stored in onboard data storage of EV 12 and/or trailer 14 or in the cloud, as indicated by process block 64. Trailer 14 is then connected to EV 12 to form combined vehicle system 10 which includes integrated (combined) powertrain 52 comprised of vehicle powertrain 16 and trailer powertrain 18, as indicated by process block 66. A user of combined vehicle system 10 then selects the model or type of trailer 14 such as via a human-machine interface (HMI) of EV 12, as further indicated by process block 66. This selection is for identifying trailer 14 whereby the efficiency contour map for the particular model or type of trailer powertrain 18, as opposed to the efficiency contour map for some other model or type of trailer powertrain, will be used for the energy management optimization strategy.

The operation further includes creating a combined efficiency contour map for integrated powertrain 52 from the individual efficiency contour maps for vehicle powertrain 16 and trailer powertrain 18, as indicated by process block 68. The individual efficiency contour maps for vehicle powertrain 16 and trailer powertrain 18 are selected from onboard data storage or downloaded from the cloud, as further indicated by process block 68. Integrated powertrain 52 is then operated according to the combined efficiency contour map to propel EV 12, with trailer 14 connected thereto, as indicated by process block 70. The operation of integrated powertrain 52 is handled by vehicle controller 36 alone or in conjunction with trailer controller 50 as described above. The operation of integrated powertrain 52 is adapted based on encountered conditions, as further indicated by process block 70.

Figure 4B:
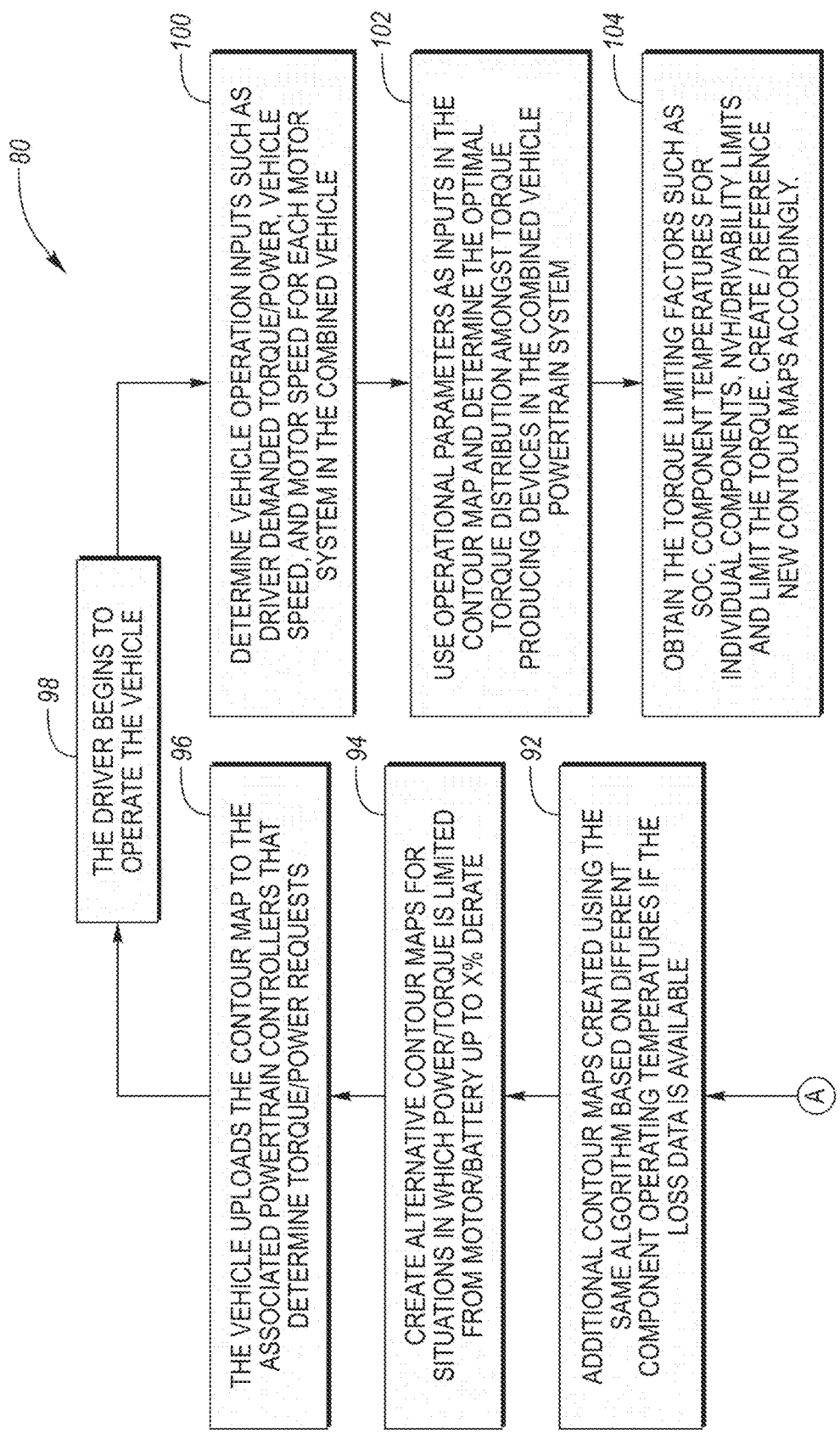

Referring now to FIGS. 4A and 4B, with continual reference to FIGS. 1, 2A, 2B, and 3, a more detailed flowchart 80 depicting operation of the energy management optimization strategy is shown. For simplicity, it is assumed that vehicle controller 36 alone and without trailer controller 50 handles aspects of the operation.

The operation begins with vehicle controller 36 detecting whether an electrically powered trailer has been connected to EV 12, as indicated by decision block 82. The operation continues once an electrically powered trailer, such as trailer 14, is connected to EV 12. Upon continuation of the operation, vehicle controller 36 sources loss data for each torque producing device (e.g., electric motor 24), traction battery (e.g., traction battery 20), and gearbox system (e.g., transmission 28) of vehicle powertrain 16 and sources loss data for each torque producing device (e.g., electric motor 42) and traction battery (e.g., traction battery 40) of trailer powertrain 18, as indicated by process block 84. As described, the loss map creation occurs during development of the vehicle powertrain/vehicle and during development of the trailer powertrain/trailer. Optimal torque vectoring between each electric motor is predetermined based on wheel torque and vehicle (trailer) speed.

Vehicle controller 36 then determines how many and which types of motor/torque producing devices are on vehicle powertrain 16 (and on trailer powertrain 18), as indicated by process block 86.

A maximum system efficiency algorithm is then used to calculate a most efficient operating point for every torque demand/vehicle speed combination within the combined vehicle capability for the individual vehicle powertrain 16 and trailer powertrain 18, as indicated by process block 88. The algorithm iterates through each potential speed/torque combination/option to meet a desired torque/power request by changing the torque/power produced by each torque producing device on vehicle powertrain 16 and trailer powertrain 18 (trailer powertrain 18 produces "X" Nm, vehicle powertrain 16 produces "Y" Nm, loss is "Z" Nm, and repeat). Once the algorithm iterates through each operating point, the algorithm determines the torque split/operating conditions for each point with the lowest energy consumption/lowest loss. These are the ideal operating points for integrated powertrain 52 and are programmed into the contour map and combined vehicle calibration. In conjunction with process block 88, a combined powertrain efficiency plot for integrated powertrain 52 is generated using an iterative-perturbation algorithm, as indicated by process block 90.

Figure 5A:
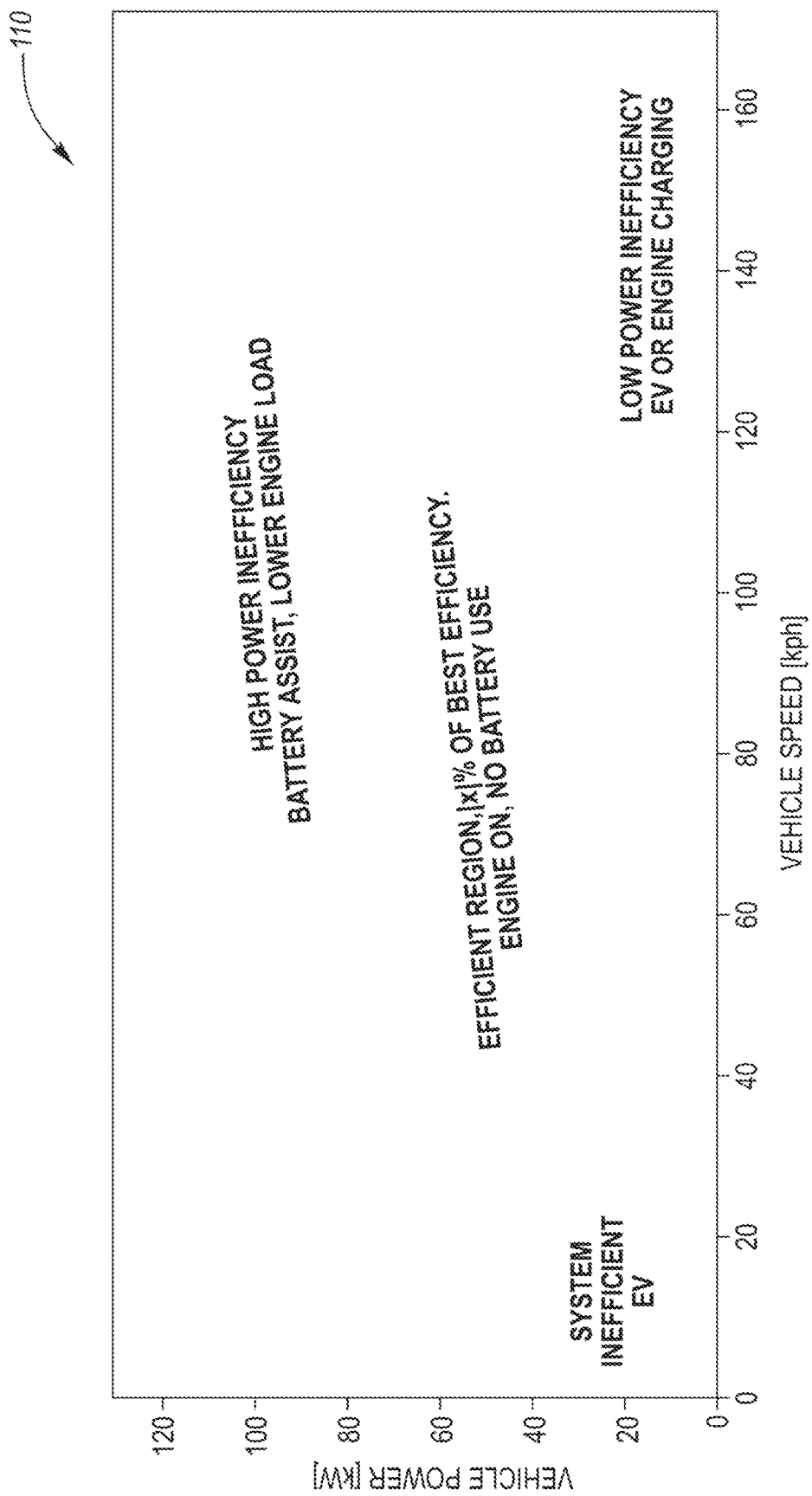
FIG. 5A illustrates an exemplary efficiency contour map for the vehicle powertrain.
Figure 5B:
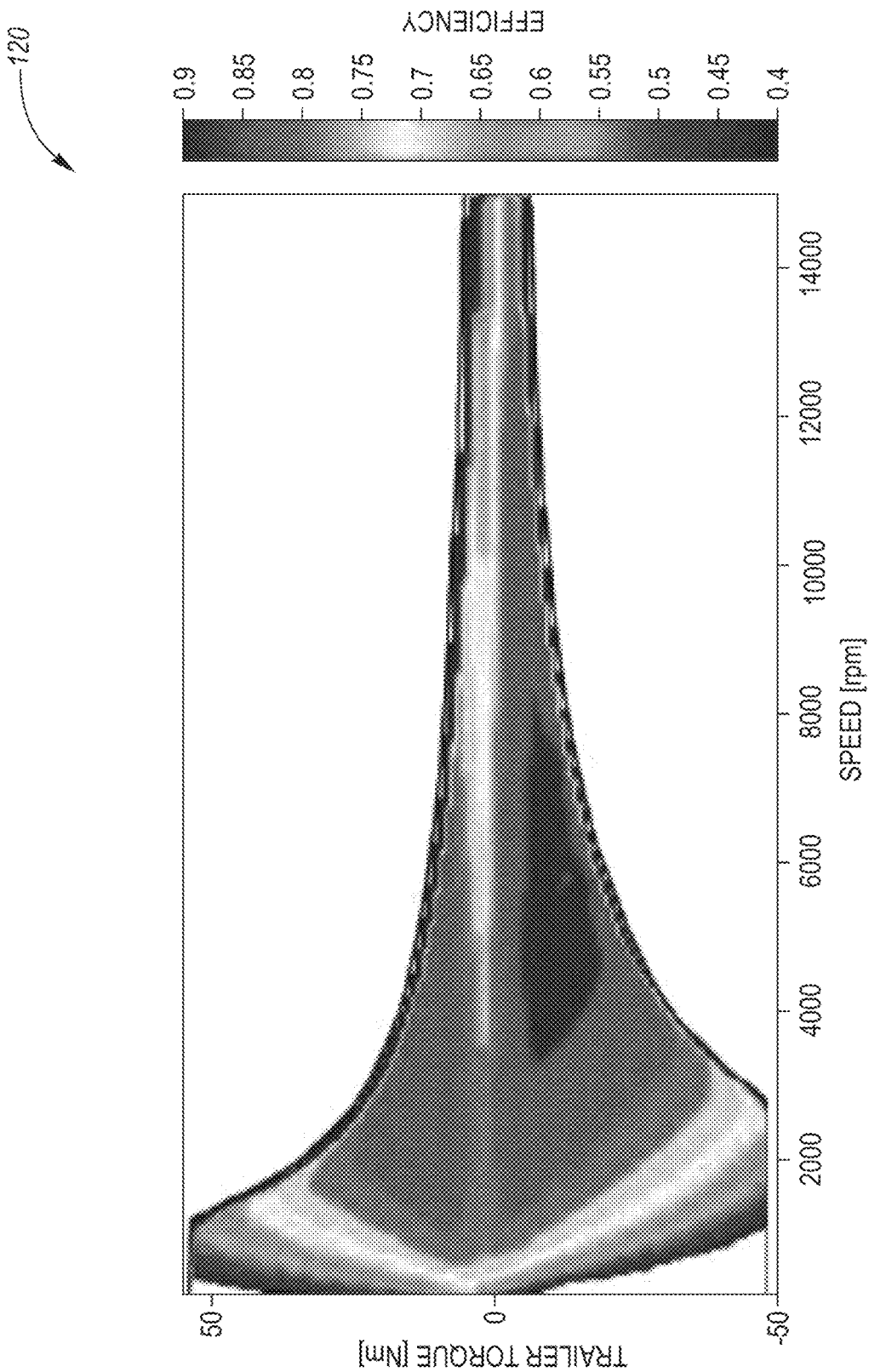
FIG. 5B illustrates an exemplary efficiency contour map for the trailer powertrain.
Figure 5C:
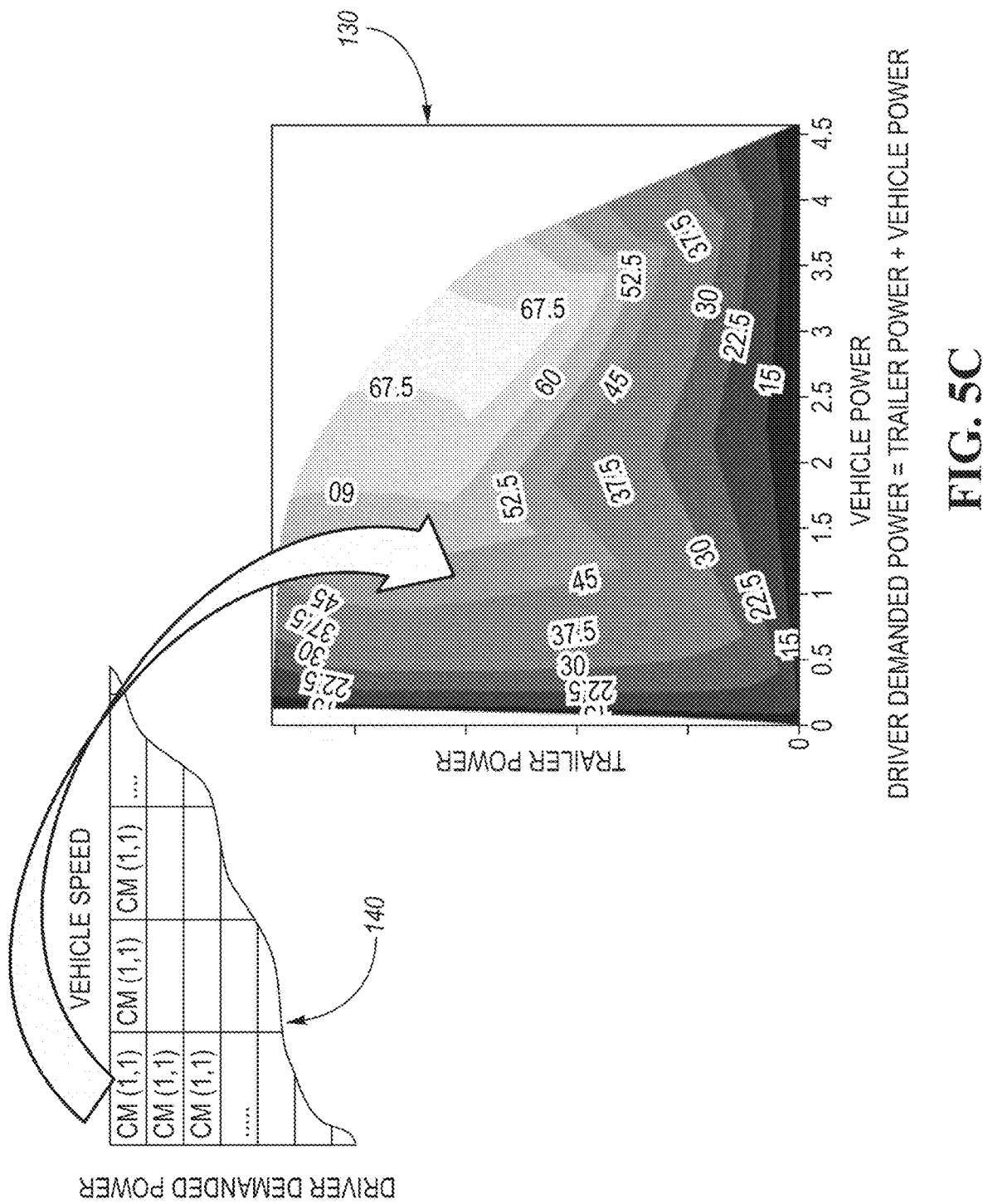
FIG. 5C illustrates an exemplary combined efficiency contour map for the integrated powertrain, the combined efficiency contour map being a function of the efficiency contour map for the vehicle powertrain and the efficiency contour map for the trailer powertrain, and the combined efficiency contour map being generated from an exemplary three-dimensional efficiency contour table for the integrated powertrain.

The operation of process blocks 88 and 90 will be described in further detail with reference to FIGS. 5A, 5B, and 5C. FIG. 5A illustrates an exemplary efficiency contour map 110 for vehicle powertrain 16; FIG. 5B illustrates an exemplary efficiency contour map 120 for trailer powertrain 18; and FIG. 5C illustrates an exemplary combined efficiency contour map 130 for integrated powertrain 52 that is generated from an exemplary three-dimensional (3D) efficiency contour table 140 for the integrated powertrain. As described, the operation of process blocks 88 and 90 entails creating a combined efficiency contour map (i.e., combined efficiency contour map 130) for integrated powertrain 52 from the individual efficiency contour maps (i.e., efficiency contour map 110 for vehicle powertrain 16 and efficiency contour map 120 for trailer powertrain 18). In this way, combined efficiency contour map 130 for integrated powertrain 52 is a function of (i) efficiency contour map 110 for vehicle powertrain 16 and (ii) efficiency contour map 120 for trailer powertrain 18.

More particularly, as noted, the maximum system efficiency algorithm determines the torque split/operating conditions for each point with the lowest energy consumption/lowest loss. These are the ideal operating points for integrated powertrain 52. The operating conditions are a function of driver demanded power and vehicle speed; and the driver demanded power is the demanded power of combined vehicle system 10 (i.e., the driver demanded power is the sum of (i) the power of vehicle powertrain 16 and (ii) the power of trailer powertrain 18). Initially, the maximum system efficiency algorithm uses efficiency contour map 110 for vehicle powertrain 16 and determines power to be drawn from vehicle powertrain 16 that is in the most efficient region of efficiency contour map 110. Next, the maximum system efficiency algorithm uses efficiency contour map 120 for trailer powertrain 18 and determines efficiency for the remaining power to be drawn from trailer powertrain 18 (vehicle speed is a constant). (The remaining power is the power from vehicle powertrain 16 subtracted from the driver demanded power.) The maximum system efficiency algorithm then runs an iterative algorithm, which is based on perturbation, to determine whether the combined efficiency could be increased with different torque splits. This information is stored as three-dimensional efficiency contour table 140, which converts into combined efficiency contour map 130 for integrated powertrain 52. Combined efficiency contour map 130 is a contour map for integrated powertrain 52 that is generated for each driver demanded power and vehicle speed combination of combined vehicle system 10.

Turning back to FIG. 4, the operation may further continue with creating additional contour maps using the same algorithm based on different powertrain component operating temperatures when the loss data is available, as indicated by process block 92. Alternative contour maps for situations in which power/torque is limited from motor/battery up to X % derate may be created, as indicated by process block 94.

The operation further includes EV 12 uploading combined efficiency contour map 130 for integrated powertrain 52 to the associated powertrain controllers that determine torque/power requests, as indicated by process block 96. In this example, combined efficiency contour map 130 is uploaded to vehicle controller 36.

Operation of combined vehicle system 10 by a driver of EV 12 then begins, as indicated by process block 98. During operation of combined vehicle system 10, vehicle controller 36 determines vehicle operation inputs such as driver demanded torque/power, vehicle speed, motor speeds, and the like, as indicated by process block 100. In turn, vehicle controller 36 uses operational parameters as inputs in combined efficiency contour map 130 for integrated powertrain 52 and determines therefrom the optimal torque distribution amongst torque producing devices in the powertrains (i.e., vehicle powertrain 16 and trailer powertrain 18) comprising the integrated powertrain, as indicated by process block 102.

The operation may further include obtaining torque limiting factors such as SOC, component temperatures for individual components, and NVH/drivability limits, and limiting the torque, and accordingly creating or referencing new contour maps, as indicated by process block 104.

The description of the operation of flowchart 80 is exemplary. Other considerations that could be accounted for by creating new contour maps can include: NVH constraints; thermal derate of traction battery/engine/electric motors/inverter/gearbox/etc. on the vehicle and/or the trailer (separate contour maps can be created for either scenario based on detecting a thermal derate event); stability constraints during braking; and supply energy constraints and trip metrics.

Regarding supply energy constraints and trip metrics, based on the estimated length of the trip and the energy available for use on the vehicle/trailer, certain powertrains could be leveraged more to ensure both powertrains can provide propulsion assistant throughout the duration of the trip. When the vehicle powertrain is gas based and the trailer powertrain is electrified, the trailer might have a more limited energy supply than the vehicle and as a result the output torque should be rationed or regen braking should occur as frequently as possible to recharge the traction battery of the trailer. When the vehicle powertrain is of a hybrid variant, the engine can run to charge the traction batteries of the vehicle and the trailer and separate contour maps should be created. When both powertrains are electrified and the energy storage system on the trailer is separate from the vehicle, biasing the torque of the units may be needed. When both powertrains are electrified and a shared energy system is used (the situation that is assumed in flowchart 80), the true most efficient operating conditions can be realized throughout the trip due to the vehicle/trailer having the ability to pull energy from the same energy storage device or transfer energy between storage devices.

As described, this disclosure relates to an electrically powered vehicle and an electrically powered trailer towed by the vehicle. The trailer includes its own powertrain having a traction battery and an electric motor for propelling the trailer. A combined vehicle-trailer integrated powertrain energy management method is provided that factors in system level electrical and mechanical losses across all operation conditions to determine a most efficient powertrain operation for the combined vehicle powertrain system. The method uses torque vectoring between each powered axle and propulsion source on the vehicle and the trailer. The method maps efficiency contour maps for the vehicle and the trailer for various inputs such as speed, torque, SOC, and others. The method develops a new combined efficiency contour map when the trailer is connected to the vehicle, updates the calibration tables for the various vehicle and trailer components, and controls the components for efficiency or torque split based on the operational status of the vehicle. The unique calibrations or contour maps for a vehicle and trailer pair may be shared with other vehicles such as via V2X.

As described, advantages of the integrated powertrain energy management optimization strategy include being implementable for various types of vehicle and trailer powertrain architectures, allowing for electrified vehicles to tow heavier trailer loads, reducing need for tow specific capable vehicles, increasing vehicle range, and leveraging existing vehicle and trailer data to optimize usage of the integrated vehicle/trailer powertrain.

The algorithms, methods, or processes disclosed herein can be deliverable to or implemented by a computer, controller, or processing device, which can include any dedicated electronic control unit or programmable electronic control unit. Similarly, the algorithms, methods, or processes can be stored as data and instructions executable by a computer or controller in many forms including, but not limited to, information permanently stored on non-writable storage media such as read only memory devices and information alterably stored on writeable storage media such as compact discs, random access memory devices, or other magnetic and optical media. The algorithms, methods, or processes can also be implemented in software executable objects. Alternatively, the algorithms, methods, or processes can be embodied in whole or in part using suitable hardware components, such as application specific integrated circuits, field-programmable gate arrays, state machines, or other hardware components or devices, or a combination of firmware, hardware, and software components. The words processor and processors may be interchanged herein, as may the words controller and controllers.

While exemplary embodiments are described above, it is not intended that these embodiments describe all possible forms encompassed by the claims. The words used in the specification are words of description rather than limitation, and it is understood that various changes may be made without departing from the spirit and scope of the disclosure. Additionally, the features of various implementing embodiments may be combined to form further embodiments.

What is claimed is:

1. A system comprising:
a vehicle having an electrically powered trailer towed thereto, the vehicle having a vehicle powertrain including a first drive axle and a first traction battery and the trailer having a trailer powertrain including a second drive axle and a second traction battery, the vehicle and the trailer being connected, and the vehicle powertrain and the trailer powertrain forming an integrated powertrain while the vehicle and the trailer are connected; and
a controller programmed to, in order to propel the vehicle with the trailer towed thereto in response to a driver demanded power at a given speed of the vehicle, operate the integrated powertrain according to a combined efficiency map based on (i) an efficiency map associated with the vehicle powertrain and (ii) an efficiency map associated with the trailer powertrain, the combined efficiency map including for each of a plurality of driver demanded power and vehicle speed combinations a torque split between the drive axles which results in lowest energy consumption of the integrated powertrain; and
wherein the controller is further programmed to, upon the vehicle and the trailer being connected, obtain loss data of components of each of the vehicle powertrain and the trailer powertrain; and
the combined efficiency map is further based on the loss data of the components and differences in operating temperatures of the components.

2. The system of claim 1 wherein:
the controller is further programmed to control components of the vehicle powertrain including the first traction battery and components of the trailer powertrain including the second traction battery according to the torque split for the driver demanded power and the given vehicle speed combination in realizing operation of the integrated powertrain according to the combined efficiency map.

3. The system of claim 1 wherein:
the vehicle powertrain further includes an engine.

4. The system of claim 1 wherein:
the controller is further programmed to cause electrical power to be transferred between the first traction battery and the second traction battery to maintain operation of the integrated powertrain according to the combined efficiency map.

5. The system of claim 1 wherein:
the controller is further programmed to share the efficiency map associated with the vehicle powertrain and/or the efficiency map associated with the trailer powertrain with a third party.

6. A control system for a combined vehicle system having a vehicle and an electrically powered trailer towed by the vehicle, the vehicle having a vehicle powertrain including a first drive axle and a first traction battery and the trailer having a trailer powertrain including a second drive axle and a second traction battery, the vehicle and the trailer being connected, and the vehicle powertrain and the trailer powertrain forming an integrated powertrain while the vehicle and the trailer are connected, the control system comprising:
a controller programmed to, in order to propel the combined vehicle system in response to a driver demanded power at a given speed of the combined vehicle system, operate the integrated powertrain according to a combined efficiency map based on (i) an efficiency map associated with the vehicle powertrain and (ii) an efficiency map associated with the trailer powertrain, the combined efficiency map including for each of a plurality of driver demanded power and combined vehicle system speed combinations a torque split between the drive axles which results in lowest energy consumption of the integrated powertrain; and
wherein the controller is further programmed to, upon the vehicle and the trailer being connected, obtain loss data of components of each of the vehicle powertrain and the trailer powertrain; and
the combined efficiency map is further based on the loss data of the components and differences in operating temperatures of the components.

7. The control system of claim 6 wherein:
the controller is further programmed to cause electrical power to be transferred between the first traction battery of the vehicle powertrain and the second traction battery of the trailer powertrain to maintain operation of the integrated powertrain according to the combined efficiency map.

* * * * *